May 4, 1948.   M. CAWEIN   2,440,737
AIRCRAFT ANTENNA
Filed Dec. 24, 1943

INVENTOR
MADISON CAWEIN

BY *Edwin De Martin*
ATTORNEY

Patented May 4, 1948

2,440,737

UNITED STATES PATENT OFFICE 2,440,737

AIRCRAFT ANTENNA

Madison Cawein, Fort Wayne, Ind., assignor, by mesne assignments, to Farnsworth Research Corporation, a corporation of Indiana Application December 24, 1943, Serial No. 515,487

5 Claims. (Cl. 250—33)

This invention relates generally to radiant energy antenna devices and more particularly to antenna structure particularly adapted for use with aircraft.

Prior art antenna devices for use with aircraft comprise either elongated conductors adapted to be dragged by the aircraft or fixed antenna devices of various sorts which may be attached to the external skin of the aircraft. These antenna devices have been found to be directional to the extent that various elements of the aircraft reflect or absorb radiant energy propagated therefrom. Because of these reflection or absorption effects, the field of distribution of energy radiated from the conventional forms of antenna is found to be considerably distorted in certain directions depending upon the direction of flight of the aircraft. Obviously it would be extremely desirable to obtain a field of distribution which is substantially uniform in all directions.

Conventional antenna devices adapted for aircraft use have a further disadvantage in that energy propagated by them is modulated to an objectionable degree by the rotating air screws which form component parts of all aircraft. Thus, in certain directions from a craft in flight, signals radiated from that craft include noise modulations having a frequency determined by the rate of rotation of the air screws.

Because of the well-known reciprocity laws, the statements made hereinbefore apply equally to receiving antennae and their associated field patterns.

Accordingly, the principal object of this invention is to provide a novel antenna structure for aircraft.

Another object of this invention is to provide a novel point source of radiation in an antenna structure for aircraft.

Another object of this invention is to provide a novel apparatus for preventing air screw modulation of signals radiated from aircraft or received therein.

Still another object of this invention is to provide novel apparatus in aircraft for radiating or receiving electromagnetic energy over a relatively uniform field.

In accordance with this invention, there is provided in combination with, for example, a multinotored aircraft, an antenna structure consisting of a non-directive antenna in the form of a plastic glider having metallic radiation elements. For preventing objectionable air screw modulation and for providing a substantially uniform field of distribution, this antenna is towed behind the aircraft by means of a transmission line at a tow distance of preferably ten wavelengths or more. The tow line may consist solely of a transmission line or it may consist of a transmission line reinforced by a tow cable.

For a better understanding of the invention, together with other and further objects thereof, reference is made to the following description, taken in connection with the accompanying drawing, and its scope will be pointed out in the appended claims.

Figure 1:
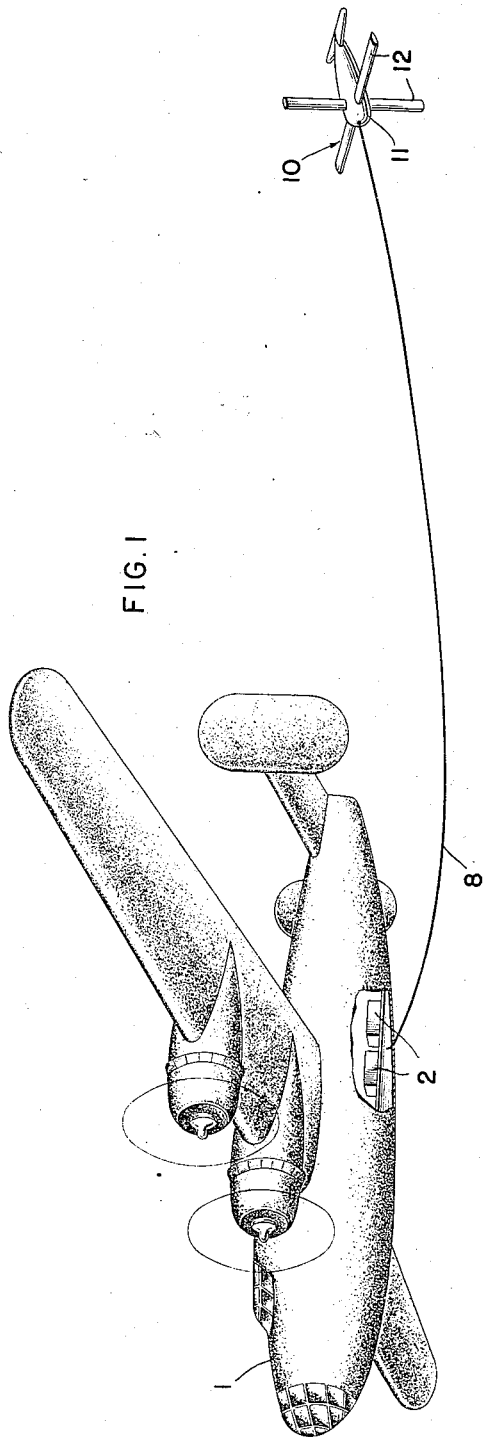
Fig. 1 illustrates an aircraft towing an antenna as provided by this invention.
Figure 2:
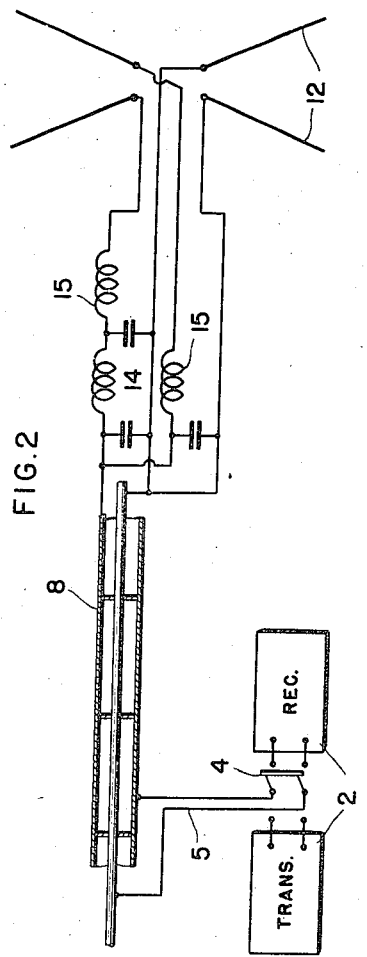
Fig. 2 is a circuit diagram illustrating the electrical connections incorporated in the apparatus illustrated in Fig. 1.

Referring to Fig. 1 of the drawings, there is illustrated therein, purely by way of example, a multi-motored aircraft 1 depicted as it would appear in flight. Within the aircraft there is provided radio transmitting and receiving apparatus 2 which may be disposed at any suitable point within the aircraft, the particular location being immaterial to this invention. Connected to the radio apparatus 2 by means of switch 4 and conductors 5 is a tow line 8 which consists of a concentric cable of conventional form.

For radiating energy from the radio apparatus 2, there is provided at the end of cable 8 an antenna 10 consisting of a streamlined plastic body structure 11 and metallic antenna elements 12. The antenna elements 12 may be formed to comprise wing sections whereby the antenna 10 may act in flight as a towed glider.

Antenna 10 is provided with circuit 14 for matching the antenna and the cable 8. Since the antenna is illustrated as a turnstile type crossed dipole, circuits 15 are also provided causing 90° phase displacement between dipole elements. It is to be noted that tow line 8 may comprise a concentric cable or a two-wire cable or a combination of such cables with a separate and distinct towing cable. Preferably tow line 8 is sufficiently long to space antenna 10 at least ten wavelengths or more beyond all metal surfaces of the aircraft.

As pointed out hereinbefore, conventional antenna structures are necessarily associated with an aircraft in such fashion that the metal surfaces of the aircraft absorb or shield energy radiated by the antenna to such an extent that the field of distribution is widely different in various directions from the aircraft. Furthermore, as was also mentioned hereinbefore, air screw modulation occurs when conventional antenna structures are associated with aircraft. It will be obvious from the above description of this invention that the field of distribution from a non-directional antenna such as 10 would be relatively uniform by reason of the fact that the antenna is spaced sufficiently far from all metal surfaces of the aircraft to prevent objectionable absorption or shielding by its surfaces. Furthermore, by spacing the antenna, as illustrated herein, propeller modulation is lessened to such a degree that it is substantially nonexistent. As pointed out hereinbefore, the invention is equally advantageous for receiving energy.

It is not intended that this invention shall be limited to the particular type of antenna illustrated herein since the provision of stabilizing tail surfaces on the glider make it obviously feasible to use directional antenna of various types when directional field distribution is desirable. It is also to be noted that the invention is not limited to the particular type of aircraft illustrated herein since it is equally applicable to many other types of aircraft such, for example, as lighter-than-air craft.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination, an air-borne craft including a modulating device, radiant energy transmitting and receiving apparatus disposed within said craft, an air-borne energy radiating antenna spaced with respect to said craft substantially beyond the modulation range of said modulating device and a concentric conductor connecting said apparatus and said antenna for towing said antenna and supplying energy thereto.

2. In combination, an air-borne craft including a rotating device, radiant energy converting apparatus disposed within said craft, an energy radiating antenna spaced with respect to said craft substantially beyond the modulation range of said rotating device and an electrically conductive non-radiating cable connecting said apparatus and said antenna for transferring energy between said apparatus and said antenna.

3. In combination, an air-borne craft including radiant energy absorbing or reflecting surfaces, radiant energy converting apparatus disposed within said craft, an energy radiating air-borne antenna spaced with respect to said craft a distance sufficient substantially to prevent absorption or reflection by said surfaces of energy radiated by said antenna, and a non-radiating electrical conductor connecting said apparatus and said antenna for towing said antenna and transferring energy between said apparatus and said antenna.

4. In combination, an air-borne craft including radiant energy absorbing or reflecting surfaces, radiant energy converting apparatus disposed within said craft, an energy radiating antenna spaced with respect to said craft a distance sufficient substantially to prevent absorption or reflection by said surfaces of energy radiated by said antenna, and a non-radiating electrical conductor connecting said apparatus and said antenna for transferring energy between said antenna and said apparatus.

5. In combination, an air-borne craft, radiant energy converting apparatus disposed within said craft, an energy radiating antenna spaced with respect to said craft a distance equivalent to several wavelengths of the energy transmitted or received by said apparatus and a non-radiating electrical conductor connecting said apparatus and said antenna for transferring energy between said antenna and said apparatus.

MADISON CAWEIN.

REFERENCES CITED

The following references are of record in the file of this patent:

UNITED STATES PATENTS

| Number | Name | Date |
|---|---|---|
| 1,492,300 | Lowy | Apr. 29, 1924 |
| 1,893,287 | Jenkins | Jan. 3, 1933 |
| 1,977,198 | Nicolson | Oct. 16, 1934 |
| 2,251,418 | Pavlik | Aug. 5, 1941 |
| 2,338,564 | Aram | Jan. 4, 1944 |